United States Patent [19]

Ward et al.

[11] 4,297,415

[45] Oct. 27, 1981

[54] HEAT-SEALABLE POLYPROPYLENE FILMS

[75] Inventors: Herbert J. Ward, Bristol; Derek J. Dobbie; Brian Lyall, both of Bridgwater, all of England

[73] Assignee: British Cellophane Limited, Somerset, England

[21] Appl. No.: 69,091

[22] Filed: Aug. 23, 1979

[30] Foreign Application Priority Data

Sep. 6, 1978 [GB] United Kingdom ............... 35846/78

[51] Int. Cl.$^3$ ........................ B32B 27/32; B32B 31/14
[52] U.S. Cl. .................................... 428/516; 156/229; 156/244.11; 156/244.24; 156/244.27; 264/210.7; 426/127; 428/500; 428/515; 428/523; 428/910
[58] Field of Search ............... 428/516, 523, 910, 500, 428/515; 426/127; 156/229, 244.11, 244.27; 264/210.7, 510

[56] References Cited

U.S. PATENT DOCUMENTS

| | | | |
|---|---|---|---|
| T941,020 | 12/1975 | Young | 428/520 |
| T955,009 | 2/1977 | Lansbury | 428/515 |
| 3,397,101 | 8/1968 | Rausing | 156/229 |
| 3,891,008 | 6/1975 | D'Entremont | 428/516 |
| 4,147,827 | 4/1979 | Breidt | 428/517 |
| 4,252,851 | 2/1981 | Lansbury | 428/516 |

FOREIGN PATENT DOCUMENTS

1145199  3/1969  United Kingdom .
1440317  6/1976  United Kingdom .

*Primary Examiner*—Ellis P. Robinson
*Attorney, Agent, or Firm*—Watson, Cole, Grindle & Watson

[57] ABSTRACT

A heat-sealable oriented polypropylene film comprising a base oriented polypropylene film having on one surface a layer of a random propylene/ethylene copolymer (ethylene content 2–6% by weight) and on the other surface a predominantly linear random copolymer of ethylene and a further alpha olefin having at least three carbon atoms per molecule (for example propylene and butene-1) the further alpha olefin content being 6–40% by weight. The film is particularly useful for packaging merchandise on horizontal form-fill-seal packaging machines.

9 Claims, No Drawings

HEAT-SEALABLE POLYPROPYLENE FILMS

This invention relates to heat-sealable polypropylene films.

Polypropylene film is well known for use as a packaging material. It has high clarity, excellent barrier properties with respect to water vapour and excellent strength, particularly when its molecular structure has been oriented by stretching in one or preferably two directions at right angles to each other while subjected to a temperature in the range between 2° C. below the crystalline melting point of the polypropylene and its second order transition temperature.

Although polypropylene film is inherently heat-sealable to itself and is capable of forming heat-seals of adequate strength at temperatures of about 160° C., at such temperatures and down to about 140° C. oriented polypropylene film will shrink and produce undesirable buckling in the region of the heat-seal.

It is known to overcome this distortion problem by forming on one or both surfaces of the oriented polypropylene film a layer of a heat-sealable polymer or copolymer capable of forming heat-seals of adequate strength at temperatures below the temperature at which heat distortion occurs to any significant extent in the base oriented polypropylene film.

One such known heat-sealable copolymer applied to one or both surfaces of an oriented base polypropylene film is a propylene/ethylene copolymer in which the ethylene content lies in the range between 2% and 6% by weight as described in British Pat. No. 1145199. Another such known heat-sealable copolymer is a predominantly linear random copolymer of ethylene with at least one further alpha olefin having at least three carbon atoms per molecule, present up to about 12 mole percent in the copolymer, such as described in out British Pat. No. 1440317.

Heat-sealable oriented polypropylene films having heat-sealable outer layers of these heat-sealable copolymers are used extensively upon high speed packaging machines known as "form-fill-seal" machines, in which merchandise is packed into individual sealed bags formed from the films in one continuous operation. In a so-called horizontal "form-fill-seal" machine (such as the "Versoflow" machine marketed by Auto Wrappers or Norwich, England) merchandise, for example, individual trays of confectionery, is forwarded to an input end of the machine at predetermined intervals and is covered by a continuous length of film. The film is folded over the merchandise and the edges of the film are brought together beneath the merchandise between a pair of nip rollers which serve to pull the film from its supply roll. The edges of the film then pass between one or more heated rollers which further provide traction upon the film and seal the edge margins together to form a longitudinal fin seal thus enclosing the merchandise in a tube of film. Transverse seals are then formed across the tube between each unit of merchandise by crimp heat-sealing jaws and individual sealed bags each containing a unit of merchandise are separated by severing through the body of each transverse seal.

Usually the film is pre-printed at bag length intervals together with a series of datum marks which are "read" with an electric "eye" to check that the printing lies in register with the transverse sealing operation. If through gradual movement of the film from register the "eye" fails to detect a datum mark, the feed of film is temporarily speeded up or slowed down (depending upon the make of the machine) to bring the film back into register. If, however, the movement of the film from register exceeds about 5 millimeters, for example, through excessive slip on the nip roller applying traction to the film, the register control is lost and excessive speeding up or slowing down (as the case may be) of the film feed results in the heat-seal jaws operating across the merchandise causing considerable damage and loss of production.

During the transverse sealing operation, the longitudinal fin seal is so placed that it is turned and flattened against the body of the tube and is tack-sealed by virtue of the outer heat-sealable copolymer layer to each transverse seal.

The speed of the film through the horizontal form-fill-seal machine depends upon the speed at which heat-seals of adequate strength, particularly the transverse heat-seals, can be made. The strength of the heat-seal is measured by cutting a superposed pair of strips from a formed bag, 38 millimeter wide, with the heat-seal towards one end of the pair. The force in grams required to peel the strips apart at the seal is measured and is termed the heat-seal strength. For most purposes, the minimum acceptable heat-seal strength is 450 grams/38 millimeters.

When the film used on the horizontal form-fill-seal machine is a base oriented polypropylene film having on each surface a layer of a random propylene/ethylene copolymer (ethylene content being between 2% and 6% by weight), the packaging operation is satisfactory at relatively low speeds, but at higher speeds, the heat-seal strength of the transverse heat-seals fall below the acceptable limit. This is due to the dwell time of the heat-seal jaws being insufficient to raise the temperature of the film portions being sealed to the temperature required to give effective sealing.

Higher speeds with acceptable heat-seals may be attained by employing a base oriented polypropylene film having on each surface a layer of a predominantly linear random copolymer of ethylene with at least one further alpha olefin having at least three carbon atoms per molecular present in the range between 6% and 40% by weight, since these copolymers are capable of providing heat-seals of adequate strength at lower heat-seal temperatures than the propylene/ethylene copolymers. However, such heat-sealable polypropylene film tends to slip excessively when passing through the nip rollers and heated rollers and as a result the register adjusting mechanism loses control, the length of bags produced on the machine varies widely and considerable damage is caused by the heat-seal jaws closing over the merchandise.

The present invention is concerned with an improved heat-sealable polypropylene film particularly for use on horizontal form-fill-seal machines.

SUMMARY OF THE PRESENT INVENTION

According to the present invention a heat-sealable oriented polypropylene film comprises a base oriented polypropylene film having on one surface a layer of a random propylene/ethylene copolymer in which the ethylene content lies in the range between 2% and 6% by weight, and on the other surface a predominantly linear random copolymer of ethylene and between 6% and 40% by weight of the random copolymer of at least one further alpha olefin having at least three carbon atoms per molecule.

It will be readily appreciated by one skilled in the art that the term "base oriented polypropylene film" includes an oriented film of propylene homopolymer, a copolymer of propylene with a minor amount (e.g. up to 15%) of a further olefin such as ethylene or a blend of such a homopolymer or copolymer with a small proportion of a compatible polyolefin which does not significantly affect the physical characteristics of the film.

The term "predominantly linear random copolymer of ethylene with at least one further alpha olefin" means a copolymer formed by reacting the monomers under conditions which favour the formation of linear chains of ethylene units with little branching and with random distribution of the comonomer or comonomers along the chains. Such conditions are attained by low pressure catalytic procedures employing, for example, a co-ordination or organometallic catalyst such as a so-called Ziegler catalyst.

Preferably the amount of further alpha olefin in the random copolymer of ethylene lies in the range between 10% and 35% by weight of the random copolymer and is either propylene or butene-1.

The heat-sealable oriented polypropylene film in accordance with the invention is particularly useful for running on horizontal form-fill-seal machines with the layer of the predominantly linear random copolymer of ethylene/further alpha olefin facing the merchandise, since at relatively high machine speeds, heat-seals of adequate strength are achieved together with the minimum of slip past the nip rollers applying the traction.

The heat-sealable layers may be applied to the base propropylene film by any one of the known methods. For example, preformed films of the propylene/ethylene copolymer and the ethylene/alpha olefin copolymer may be laminated to a base oriented propylene film by a suitable adhesive or by stretching the preformed films while in intimate contact when the combination combines to form a unitary film. Alternatively, the propylene/ethylene copolymer and the ethylene/alpha olefin copolymer may separately be melt extruded on to each side of a base polypropylene film followed by stretching the combination under stretch-orientable conditions. Preferably, however, the heat-sealable polypropylene film is formed by co-extruding the base polypropylene film with the propylene/ethylene copolymer. and the ethylene/alpha olefin copolymer on either sie through a slot or annular orifice die followed by quenching and then stretching under stretch-orientable conditions.

The invention further includes a method for the manufacture of a heat-sealable oriented polypropylene film comprising applying to one surface of a base polypropylene film a layer of a random propylene/ethylene copolymer in which the ethylene content lies in the range between 2% and 6% by weight and to the other surface a predominantly linear random copolymer of ethylene and between 6% and 40% by weight of the copolymer of at least one further alpha olefin having at least three carbon atoms per molecule, bringing the combination to a stretch orientatable condition and stretching in at least one direction.

Since the propylene/ethylene copolymer and the ethylene/alpha olefin copolymer are compatible with polypropylene, waste heat-sealable oriented polypropylene film, for example, edge trim, may be fed back in small quantities to the polypropylene feed to the extruder for the base polypropylene film, without significantly affecting the physical characteristics of the base film.

The invention will now be more specifically described with reference to the following Example.

EXAMPLE

A polypropylene melt was co-extruded through a slot die at 2 meters/minute between one outer layer of a melt of a random propylene/ethylene copolymer having an ethylene content of 3.5% by weight and a second outer layer of a melt of a predominantly linear random copolymer of ethylene and butene-1 in which the butene-1 content was 20% by weight, thus forming a three layered molten film approximately 1,100 microns in thickness. The polypropylene constituted 92% of the thickness and each copolymer layer 4% of the thickness. The molten film was quenched on a chill roll and was then heated to a temperature of above 80° C. and stretched 5:1 in the machine direction between sets of nip rollers in which the rollers at the output end were rotated at a greater peripheral speed than the rollers at the input end. The uniaxially stretched film was then led into a stenter where it was heated to a temperature of about 155° C. and stretched transversely to 9 times its original width. The film, now biaxially oriented, was cooled, trimmed at the edges and wound into a roll.

The resulting film had high clarity and was approximately 25 microns in thickness.

A supply roll of the film was fitted to a "Versoflow" horizontal form-fill-seal packaging machine and was used to pack unit trays of confectionery into separately formed sealed bags with the ethylene/butene-1 outer layer next to the trays. The transverse heat-seals were made between crimp heat-seal jaws heated to 145° C. It was found that at speeds up to 46 meters per minute the heat-seal strength of the transverse heat-seals exceeded 450 grams/38 millimeters width. At a speed of 37 meters per minute the average pack length of the bags was measured and found to be 258 millimeters with a pack length variation, measured over 30 bags, of ±2 millimeters.

By way of control, the procedure was repeated except that both outer layers of the co-extruded melt consisted of a random propylene/ethylene copolymer having an ethylene content of 3.5% by weight. On running the heat-sealable polypropylene film so produced on the "Versoflow" packaging machine, it was found that at running speeds exceeding 22 meters per minute the heat-seal strength of the transverse heat-seals fell below the acceptable level of 450 grams/38 millimeters width. The average pack length of the bag at a speed of 20 meters per minute was measured and found to be 258 millimeters with a pack length variation, measured over 30 bags, of ±2 millimeters.

The procedure was again repeated except that both outer layers of the co-extruded melt consisted of a predominantly linear random ethylene/butene-1 copolymer in which the butene-1 content was 20% by weight. When the film was run on the "Versoflow" packaging machine, it was found that at running speeds up to 46 meters per minute the heat-seal strength of the transverse heat-seals were above the acceptable level of 450 grams/38 millimeters width. At a speed of 37 meters per minute the average pack length of the bags was measured and found to be only 240 millimeters with a bag length variation measured over 30 bags of ±7 millimeters.

We claim:

1. A heat-sealable oriented polypropylene film comprising a base film of oriented polypropylene film having on one surface a layer of a random propylene/ethylene copolymer in which the ethylene content lies in the range between 2% and 6% by weight and on the other surface a predominantly linear random copolymer of ethylene and between 6% and 40% by weight of the random copolymer of at least one further alpha olefin having at least three carbon atoms per molecule.

2. A polypropylene film as claimed in claim 1 in which amount of the further alpha olefin in the predominantly linear random copolymer lies in the range between 10% and 35% by weight.

3. A polypropylene film as claimed in claim 1 in which the further alpha olefin is propylene.

4. A polypropylene film as claimed in claim 1 in which the further alpha olefin is butene-1.

5. A method of the manufacture of a heat-sealable oriented polypropylene film comprising applying to one surface of a base polypropylene film a layer of a random propylene/ethylene copolymer in which the ethylene content lies in the range between 2% and 6% by weight and to the other surface a predominantly linear random copolymer of ethylene and between 6% and 40% by weight of the random copolymer of at least one further alpha olefin having at least three carbon atoms per molecule, bringing the combination to a stretch orientatable condition and stretching in at least one direction.

6. A method as claimed in claim 5 in which the layer of the propylene/ethylene copolymer and the layer of the copolymer of ethylene and at least one further alpha olefin are supplied to the base polypropylene film during co-extrusion of a melt of the copolymers and the polypropylene through a slot or annular orifice die following by quenching prior to stretching under stretch orientatable conditions.

7. A method as claimed in claim 5 in which the amount of the further alpha olefin in the predominantly linear copolymer lies in the range between 10% and 35% by weight of the copolymer.

8. A method as claimed in claim 5 in which the further alpha olefin is propylene.

9. A method as claimed in claim 5 in which the further alpha olefin is butene-1.

* * * * *